United States Patent [19]
Abbey

[11] 3,811,465
[45] May 21, 1974

[54] ELECTRIC-FLUIDIC DIRECT PROPORTION CONVERTER

[76] Inventor: Harold George Abbey, 75 Prospect, East Orange, N.J. 07109

[22] Filed: Feb. 16, 1972

[21] Appl. No.: 226,677

[52] U.S. Cl. ............................................. 137/487.5
[51] Int. Cl. ............................................... F16k 31/06
[58] Field of Search ........ 137/495, 505, 489.5, 492, 137/492.5, 488, 487.5, 492.5, 82; 251/141, 129

[56] References Cited
UNITED STATES PATENTS

| | | | |
|---|---|---|---|
| 2,263,819 | 11/1941 | Ray | 251/DIG. 2 |
| 3,530,888 | 9/1970 | Cable | 137/624.11 |
| 3,598,138 | 8/1971 | Hadley | 137/82 |
| 3,498,329 | 3/1970 | McCormick | 137/625.64 |
| 2,047,101 | 7/1936 | Grove | 137/505.37 |
| 2,833,304 | 5/1958 | Fish | 137/495 |
| 3,451,421 | 6/1969 | Vicenzi et al. | 137/495 |

Primary Examiner—Henry T. Klinksiek
Assistant Examiner—Robert J. Miller

[57] ABSTRACT

A direct proportion converter in which fluid pressure is directly proportioned in magnitude or quantity to an electric current, and broadly an electric to fluid proportioning device for gases or low viscosity liquids. A fluid pressure regulating valve is actuated by changes in equilibrium between an electrically generated force on one side of a diaphragm and the fluid output pressure on the opposite side of the diaphragm.

2 Claims, 5 Drawing Figures

PATENTED MAY 21 1974 3,811,465

ELECTRIC-FLUIDIC DIRECT PROPORTION CONVERTER

BACKGROUND OF THE INVENTION

This invention relates generally to converters in which force in a first form of energy (such as electrical) is proportionally correlated in quantity or intensity to the output force in a second form of energy. In recent years, there has been increased activity in the use of fluid actuated control devices, and especially air-operated valves, positioners and relays in environments where electrical and magnetic actuators are impractical or undesirable. However the use of such control systems have many times proven unsatisfactory because of inaccurate and complicated metering and regulating system elements. Applicant's invention provides for an accurate, non-complex converter for use in fluid control systems in which fluid pressure can be proportionately regulated in direct response to electrical signals by a self-regulating mechanical feedback arrangement that is inherently stable and independent of critical and sensitive mechanical linkages and valves.

BRIEF DESCRIPTION OF THE INVENTION

An electro-fluidic pressure regulating device in which an electrical signal is made to proportionally establish a fluidic pressure comprising a housing having a fluid input chamber, a fluid output chamber, a variable orifice valve separating said input chamber and said output chamber, said valve orifice being controllably opened by a direct-coupled, equilibrium seeking pressure sensitive diaphragm coupled in opposition to an electromagnetically generated force. An electrical current of a given magnitude generates the force which acts against the diaphragm or piston which upsets diaphragm equilibrium, simultaneously opening the valve allowing fluid in the input chamber to flow into the output chamber. When the force from the fluid pressure in the output chamber on the diaphragm or piston balances the force generated by the electric current on the diaphragm or piston opposite side, the regulating mechanism is balanced and the variable orifice pressure reducing valve remains at or oscillates about a mean-null balance position. Therefore, an electric current of a given magnitude will establish a corresponding proportional pneumatic or liquid pressure of a correlated, particular intensity.

It is an object of this invention to provide an electrical-fluidic converter device.

It is another object of this invention to provide a device that correlates an electric current of a particular value into pneumatic or liquid pressure of a corresponding, proportional value.

And yet another object of this invention is to provide an electro-fluidic regulating device in which an electrical current magnitude will provide a directly proportional pneumatic or liquid pressure quantity in a novel self-balancing, mechanical feed-back system that is inherently stable.

And yet still another object of this invention is to provide a device that correlates the quantity of energy in a second system with a predetermined quantity of energy in a first system.

In accordance with these and other objects, the instant invention will now be described with particular reference to the accompanying drawing.

PREFERRED EMBODIMENT OF THE INVENTION

Figure 1:
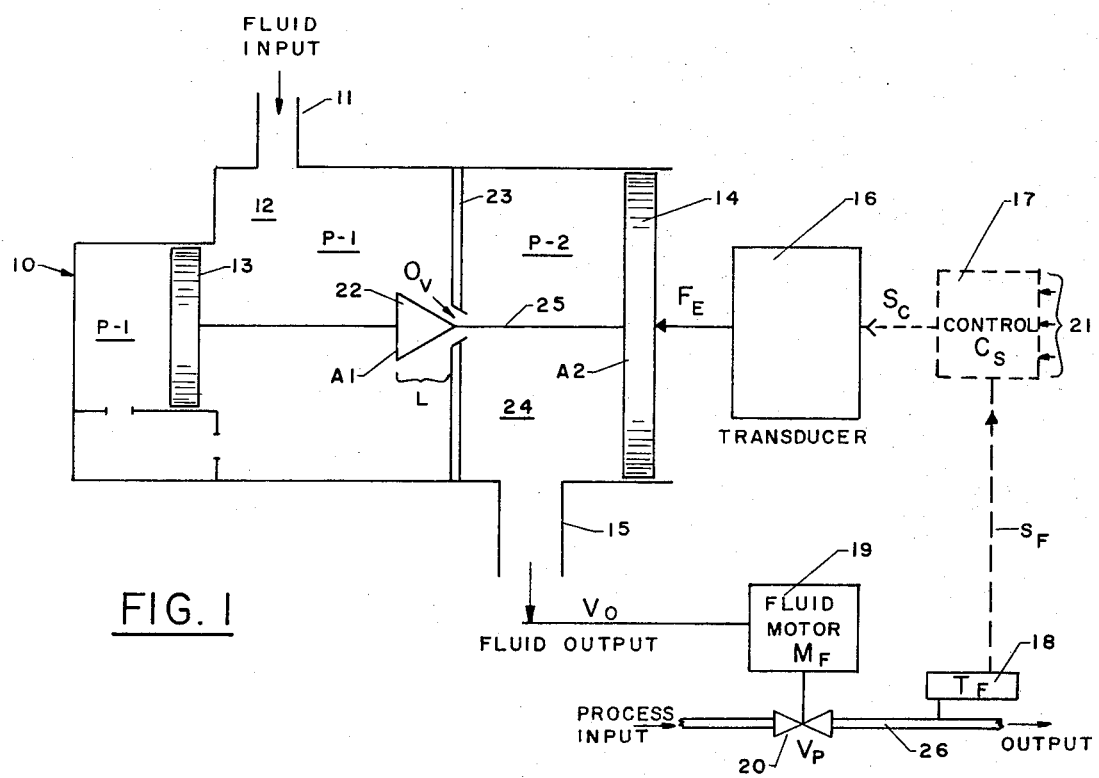
FIG. 1 is a schematic-block diagram of the distribution of forces in Applicant's device including utilization in a typical process control system illustrating the balance-null achieved for a particular set-point requirement of the control system.

Referring now to the drawings, and in particular FIG. 1, Applicant's converter 10 is shown schematically having a fluid input channel 11 opening into fluid input chamber 12 where input fluid will be at pressure $P_1$. Wall 23 with variable orifice $O_v$ separates input chamber 12 from output chamber 24. Throttling valve 22 is coupled to diaphragms 13 and 14 by rod 25 and is a variably moveable a distance L from an open position as shown to a seated position within orifice $O_v$, thus in effect providing a variable sized orifice between input chamber 12 and output chamber 24. The pressure $P_1$ is equal on both sides of diaphragm 13 so that it acts as an axial guide for valve 22. The opposite side of diaphragm 14 is mechanically coupled to a transducer 16 that converts electrical energy to mechanical energy with resultant force $F_e$ that pushes against diaphragm 14. The transducer 16 is actuated by electrical control signal $S_c$ from electric control system 17. Inputs 21 to control system 17 could represent any information such as limits, ratioing, programming or the like. Another input to the control system 17 is a feedback signal $S_f$ from process output monitor $T_f$. The proportional output of Applicant's device 10 is coupled to fluid motor $M_f$ which regulates process valve $V_p$.

When the system is in equilibrium for a specific electric signal $S_c$ $F_e - P_1 A_1 - P_2 A_2 = 0$ $P_1 A_1$ and $A_2$ are constants $F_e = P_2 A_2$; at equilibrium $F_e \sim P_2$ $F_e \sim S_c \sim L$ $P_2 \sim L$ $F_e \sim P_2$ Also $F_e \sim P_2 \sim V_o$ Thus $F_e$ positions throttleing valve $O_v$ so that force $F_o$ generated by $P_2$ acting on area $A_2$ equals $F_e$. Since any difference in $F_e$ or $F_o$ other than equality results in a displacement L of valve $O_v$ which in turn varies $P_2$ and $F_o$, the device seeks balance and the fluid output proportions to the electric generated force $F_e$ which is proportional to electric current input in an error cancelling arrangement.

Figure 2:
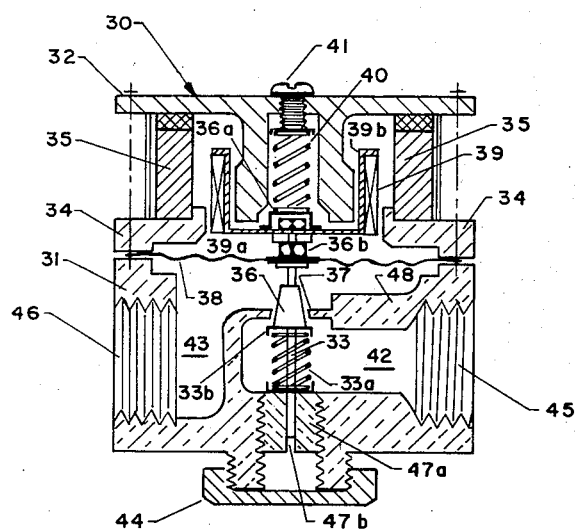
FIG. 2 is a vertical cross-section of Applicant's device.

Applicant's invention is manifested structurally in FIG. 2 shown generally at 30, having a divided housing with a top upper portion 32 coupled to top lower portion 34 and together joined to bottom portion 31, the top and bottom portions separated by flexible diaphragm 38. The bottom housing has a fluid receiving chamber 42 and a fluid outlet chamber 43 which are connected by a small, annulus orifice 37 cut through the housing chamber 48. Gas or liquid at input pressure $P_1$ enters receiving chamber 42 through inlet opening 45. Across orifice 37 is a tapered valve plug 36 which is fixedly coupled to valve guiding stem 33. The valve plug is resiliently held in the orifice 37 by spring 33A pushing against plug backing plate 33B and housing plug 47A. Valve guiding stem 33 projects through the orifice 37 and has a flanged end portion that rests against diaphragm 38. Recess 47B in the plug housing guides and permits movement of the stem 33 downward.

The top portion 32 of the upper housing and the bottom portion 34 are fixedly coupled together by conventional bolting means (not shown) and to bottom housing 31 with the diaphragm 38 separating the flanged coupling surfaces. Fixed inside top upper housing portion 32 is a ring magnet 35 clamped to the inside of housing 32 and forming an annular space 39A in the middle section.

An electrical coil 39 secured in annular-cup shaped holder 39B is fastened to valve stem 33 by nut and washer 36A and is positioned in annular space 39A with clearance between said coil 39 in holder 39B, and internal circular plug of housing 32 and annular opening in housing 34.

Spring 40 and adjusting screw 41 are for physical balancing and calibrating of the assembly.

Coil 39 is coupled electrically to a signal source that provides the interaction force in the magnetic field that displaces diaphragm 38.

In operation an electrical signal to the coil 39 generates a magnetic flux field in such magnitude and direction as to cause displacement in the permanent magnet field 35 causing displacement of valve 36 and coupled diaphragm 38.

Since this displacement opens valve 36 by forcing stem 33 downward, Pressure P2 in outer chamber 43 will build up by flow through orifice 37 from chamber 42 at pressure P1. Pressure P2 in outer chamber 43 acts against diaphragm 38 until the force of P2 against diaphragm 38 counterbalances the electric generated force Fe caused by the magnitude of the electrical signal current in coil 39.

By suitable design of the magnetic force system and the displacement-flow characteristic of the valve, linear proportioning of the fluid output to the electrical current input is achieved.

Figure 3:
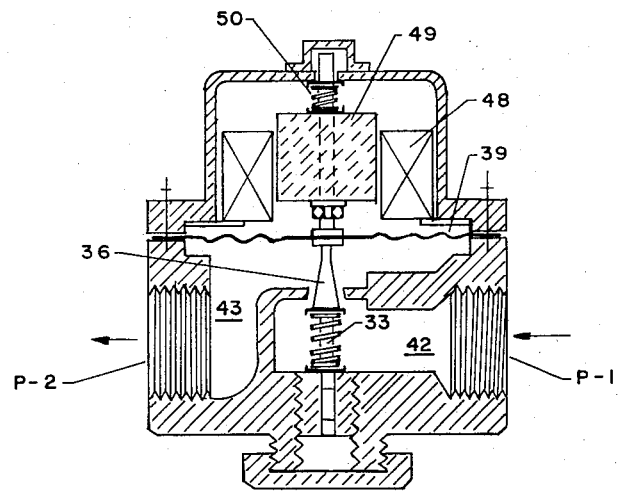
FIG. 3 is a vertical cross-section of an alternate embodiment of Applicant's invention.

FIG. 3 shows an alternate embodiment with the electromagnetic force being provided by a solenoid comprised of moving armature 49 and coil 48, the armature 49 being coupled along its axis of movement adjacent to and in line with valve stem 33 providing the mechanical force to open valve 36 upon receiving an electrical signal of the proper magnitude. The operation of the valve 36 is the same as explained above with reference to the device in FIG. 2. Spring 50 holds the armature resiliently in a predetermined position.

Figure 4:
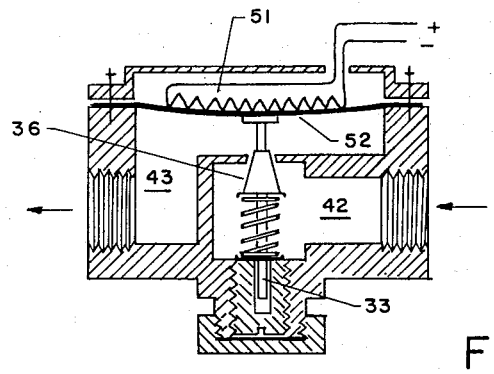
FIG. 4 is a vertical cross-section of an alternate embodiment including a bimetallic diaphragm.

FIG. 4 shows an alternate embodiment in which the electromagnetic mechanical force system is replaced by a bimetallic diaphragm 52 that is heated by resistance heater 51. Different temperatures produce different corresponding displacements of the bimetallic diaphragm 52 along the axial direction of the valve stem 33 thus providing for the opening of the valve 36 as a function of the electric current to resistance heater 51. Fluid in output chamber 43 at pressure $P_2$ will act against diaphragm 52 resisting displacement as in the preferred embodiment discussed above.

Figure 5:
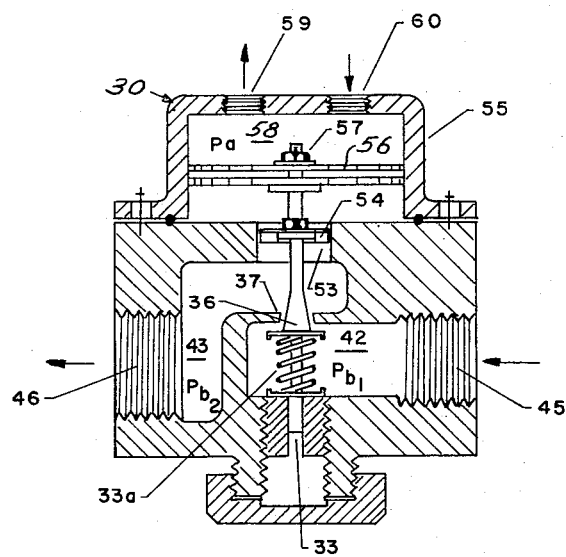
FIG. 5 is a vertical cross-section of a fluidic-converter amplifier in accordance with Applicant's invention.

FIG. 5 shows an alternate embodiment in which the electrically operated converter is replaced by a second fluid system to provide fluidic pressure amplification utilizing dual, independent fluid sources. The device insures that the fluid output pressure of a first system is proportional to the pressure in a second independent system. Threaded annular opening 45 in housing 30 provides an inlet for fluid B at pressure $B_1$ into chamber 42 that is separated from outlet chamber 43 by valve 36 seated in orifice 37 and coaxially disposed about shaft 33. Also disposed about shaft 33 are two pistons 54 and 56 of different areas, piston 54 tightly fitted within orifice 53 and piston 56 within chamber 58, which acts as a receiving chamber for fluid A with fluid A inlet 60 and fluid A outlet 59 being circular orifices in chamber wall 55. Fluid pressure on the bottom side of piston 54 creates a force on the piston surface and shaft 33 rigidly coupled to the piston, driving the shaft 33 in a vertical direction, while fluid pressure from fluid A on the top surface of piston 56 also rigidly coupled to shaft 33 drives the shaft 33 downward. Because of the different areas of the pistons 54 and 56 inverse pressure values are required to place the shaft 33 and pistons in equilibrium, according to the equation $P_a A_a = P_b A_b$. Valve 36 is kept seated by spring 33A whenever pistons 54 and 56 are in equilibrium. Whenever pressure $P_a$ is increased, the equilibrium is upset and piston 56 will move downward opening valve 36 allowing fluid B into outlet chamber 43 at pressure $P_b$. The valve will remain open until the pressure increases in chamber 43 to a valve that creates a force $F_b = P_b A_b = P_a A_a$, where $A_a$ is the area of piston A, $A_b$ is the area of piston B and $P_a$ and $P_b$ are the fluid pressures in the respective chambers. Because of the piston area differences, a small fluid pressure change in chamber 58 will produce a larger but proportioned charge in the fluid pressure in chamber 43. Thus a first signal fluid is used as the controlling input to a proportional fluid pressure amplifier.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A pressure regulating device for proportionally establishing a fluid pressure of a particular value from a particular electrical signal comprising:

housing having an inlet chamber, an output chamber, said inlet chamber separated from said output chamber by a chamber wall having a small annular orifice;

source of fluid under pressure coupled into said inlet chamber;

moveable surface means forming a wall surface of said output chamber;

tapered pressure reducing valve plug sized to fit within said orifice;

valve stem fixedly coupled to said valve plug;

resilient means for holding said valve plug within said orifice;

said valve plug coupled about said valve stem and said valve stem protruding through said orifice and having the end portion coupled to moveable surface means;
an electrical signal source;
solenoid means coupled to said source;
solenoid holder means coupled to said solenoid means and said moveable surface means at the opposite end in opposing relationship on the opposite side of said moveable surface means from said valve portion, whereby an electrical signal from said signal source will drive said solenoid means against said diaphragm and displace said resiliently held valve stem, the pressure in the output chamber on said moveable surface means pushing against said solenoid means.

2. A device as in claim 1, wherein:
said solenoid force field and said resilient means are adjusted to achieve linear proportional fluid pressure output to signal input.

* * * * *